US011246062B2

(12) United States Patent
Peng et al.

(10) Patent No.: US 11,246,062 B2
(45) Date of Patent: Feb. 8, 2022

(54) METHOD FOR ACCESSING INTER-RAT CELL AND RELATED DEVICE

(71) Applicant: Huawei Technologies Co., Ltd., Shenzhen (CN)

(72) Inventors: Wenjie Peng, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 16/259,619

(22) Filed: Jan. 28, 2019

(65) Prior Publication Data
US 2019/0159075 A1 May 23, 2019

Related U.S. Application Data

(63) Continuation of application No. PCT/CN2016/092317, filed on Jul. 29, 2016.

(51) Int. Cl.
*H04W 36/00* (2009.01)
*H04W 36/14* (2009.01)
(Continued)

(52) U.S. Cl.
CPC ... *H04W 36/0022* (2013.01); *H04W 36/0027* (2013.01); *H04W 36/0088* (2013.01);
(Continued)

(58) Field of Classification Search
CPC . H04W 36/0022; H04W 36/14; H04W 76/16; H04W 36/0027; H04W 36/0088;
(Continued)

(56) References Cited

U.S. PATENT DOCUMENTS 8,891,441 B2 * 11/2014 Gupta ................ H04W 36/14
370/328
9,769,221 B2 * 9/2017 Jheng ................ H04L 65/403
(Continued)

FOREIGN PATENT DOCUMENTS

CN 101547467 A 9/2009
CN 102547894 A 7/2012
(Continued)

OTHER PUBLICATIONS

"3rd Generation Partnership Project; Technical Specification Group Radio Access Network; Evolved Universal Terrestrial Radio Access Network(E-UTRAN); S1 Application Protocol (S1AP)(Release 13)," 3GPP TS 36.413 V13.3.0, pp. 1-331, 3rd Generation Partnership Project, Valbonne, France (Jun. 2016).

*Primary Examiner* — Ayaz R Sheikh
*Assistant Examiner* — Tarell A Hampton
(74) *Attorney, Agent, or Firm* — Leydig, Voit & Mayer, Ltd.

(57) ABSTRACT

Embodiments of the present disclosure provide a method for accessing an inter-RAT cell and a related device, and the method includes: sending, by a base station, a first message to a terminal, where the first message is used to instruct the terminal to access an inter-RAT cell, and an LTE cell and the inter-RAT cell are different cells. Beneficial effects are as follows: The first message is sent to the terminal, so that the terminal directly accesses the inter-RAT cell without a need to access the base station. In this way, the terminal does not need to perform a handover procedure, thereby reducing a delay in an access process, effectively ensuring that the terminal can successfully access the inter-RAT cell, and effectively ensuring that a radio access technology new RAT service can be performed between the terminal and a base station of the inter-RAT cell.

10 Claims, 10 Drawing Sheets

(51) Int. Cl.
  *H04W 76/16* (2018.01)
  *H04W 36/30* (2009.01)
  *H04W 48/10* (2009.01)
  *H04W 36/38* (2009.01)
  *H04W 24/10* (2009.01)
(52) U.S. Cl.
  CPC ........... *H04W 36/14* (2013.01); *H04W 36/30* (2013.01); *H04W 48/10* (2013.01); *H04W 76/16* (2018.02); *H04W 24/10* (2013.01); *H04W 36/385* (2013.01)
(58) Field of Classification Search
  CPC ... H04W 36/30; H04W 48/10; H04W 36/385; H04W 24/10
  See application file for complete search history.

(56) References Cited

U.S. PATENT DOCUMENTS

| | | | | |
|---|---|---|---|---|
| 10,674,481 B2* | 6/2020 | Chai | ...................... | H04W 72/04 |
| 2004/0114615 A1 | 6/2004 | Virtanen et al. | | |
| 2005/0286470 A1* | 12/2005 | Asthana | ................. | H04W 36/12 370/331 |
| 2007/0135080 A1* | 6/2007 | Islam | ................ | H04W 52/0251 455/343.1 |
| 2008/0299911 A1* | 12/2008 | Chen | ..................... | H04L 47/824 455/67.13 |
| 2010/0124931 A1* | 5/2010 | Eskicioglu | ............ | H04W 36/32 455/440 |
| 2010/0195616 A1* | 8/2010 | Vikberg | ............ | H04W 36/0022 370/331 |
| 2010/0291933 A1* | 11/2010 | Choi | ................. | H04W 36/0016 455/436 |
| 2010/0316000 A1* | 12/2010 | Burbidge | ............ | H04W 68/02 370/328 |
| 2010/0316034 A1 | 12/2010 | Burbidge et al. | | |
| 2011/0116629 A1* | 5/2011 | Forsberg | ............... | H04W 12/04 380/44 |
| 2011/0122845 A1* | 5/2011 | Meirosu | ............ | H04W 36/0055 370/332 |
| 2012/0224564 A1* | 9/2012 | Paisal | .................... | H04N 7/148 370/331 |
| 2012/0263145 A1* | 10/2012 | Marinier | ............... | H04W 4/023 370/331 |
| 2012/0320817 A1* | 12/2012 | Xu | .......................... | H04W 8/08 370/315 |
| 2013/0064226 A1* | 3/2013 | Dinan | .................... | H04W 36/08 370/332 |
| 2013/0122911 A1* | 5/2013 | Zdarsky | ................ | H04W 8/082 455/438 |
| 2013/0272132 A1* | 10/2013 | Heo | ........................ | H04W 4/70 370/236.2 |
| 2013/0322325 A1* | 12/2013 | Hahn | ................ | H04W 36/0009 370/315 |
| 2014/0016614 A1* | 1/2014 | Velev | .................... | H04W 36/165 370/331 |
| 2014/0051443 A1* | 2/2014 | Diachina | ........... | H04W 36/0022 455/436 |
| 2014/0092866 A1* | 4/2014 | Teyeb | ................... | H04W 36/24 370/331 |
| 2014/0189790 A1* | 7/2014 | Mindler | ................. | H04L 65/80 726/3 |
| 2014/0286314 A1* | 9/2014 | Xu | ........................ | H04W 36/28 370/331 |
| 2014/0334294 A1* | 11/2014 | Ericson | ................ | H04W 28/08 370/229 |
| 2015/0131618 A1* | 5/2015 | Chen | .................... | H04W 16/02 370/332 |
| 2015/0181481 A1* | 6/2015 | Masini | ............. | H04W 36/0083 455/436 |
| 2016/0150455 A1* | 5/2016 | Suryavanshi | ........... | H04W 4/10 455/436 |
| 2017/0105156 A1* | 4/2017 | Wu | ........................ | H04W 68/02 |

FOREIGN PATENT DOCUMENTS

| | | |
|---|---|---|
| CN | 102685910 A | 9/2012 |
| CN | 102857980 A | 1/2013 |
| CN | 103379558 A | 10/2013 |
| CN | 103385020 A | 11/2013 |
| CN | 103702393 A | 4/2014 |
| CN | 104378804 A | 2/2015 |
| EP | 2205022 A1 | 7/2010 |
| EP | 2728929 B1 | 1/2019 |
| WO | 2006103571 A1 | 10/2006 |
| WO | 2014100951 A1 | 7/2014 |
| WO | 2014166520 A1 | 10/2014 |

\* cited by examiner

METHOD FOR ACCESSING INTER-RAT CELL AND RELATED DEVICE

CROSS-REFERENCE TO RELATED APPLICATION

This application is a continuation of International Application No. PCT/CN2016/092317, filed on Jul. 29, 2016, the disclosure of which is hereby incorporated by reference in its entirety.

TECHNICAL FIELD

The present disclosure relates to the field of communications technologies, and in particular, to a method for accessing an inter-RAT cell and a related device.

BACKGROUND

As an existing Long Term Evolution (LTE) technology is increasingly mature, many new service requirements such as an ultra-high throughput service and an ultra-low delay service are imposed. To meet the new service requirements, more researches on a new radio access technology (New RAT) are conducted.

To implement rapid deployment, only a new RAT station 101 may be deployed but a new RAT core network is not deployed in an initial deployment phase of the new radio access technology. Working of the new RAT station 101 relies on an existing LTE system, and a possible system architecture is shown in FIG. 1. The new RAT station 101 may provide a new RAT air interface service for a terminal UE (User Equipment) 103, and the air interface service can meet a new service requirement.

In the system shown in FIG. 1, the UE 103 may camp on an LTE cell or a new RAT cell. When camping on the LTE cell, the UE 103 can respond to paging only from the LTE cell. When camping on the new RAT cell, the UE 103 can respond to paging only from the new RAT cell.

In an existing LTE system, when a downlink service needs to be sent to the UE 103, a network side needs to initiate paging to the UE 103 if the UE 103 is in an idle mode. A paging procedure is as follows: An MME 104 sends a paging message to a corresponding eNB 102 based on a TAI list of the UE 103, and the eNB 102 initiates paging to the UE 103 in a corresponding LTE cell. After obtaining the paging message through decoding in a cell on which the UE 103 currently camps, the UE 103 switches to a connected mode in the cell, and initiates a service request to receive data.

However, problems in the prior art are as follows: If the service is not a conventional service but is the new radio access technology new RAT, the UE 103 needs to perform data transmission at the new RAT station 101, and the UE 103 in an idle mode currently camps on the LTE cell due to a camping policy or another reason. In the prior art, the UE 103 may switch to a connected mode in the LTE cell, but it may be learned that an LTE air interface cannot meet a requirement of the new radio access technology new RAT in this case, or in other words, service transmission fails. Alternatively, to complete transmission of the new radio access technology new RAT, the UE 103 performs an inter-RAT handover procedure, and re-accesses a new RAT cell to transmit the new service. However, this process results in a relatively long delay.

SUMMARY

The present disclosure provides a method for accessing an inter-RAT cell and a related device.

A first aspect of embodiments of the present disclosure provides a method for accessing an inter-RAT cell, including:

sending, by a base station, a first message to a terminal, where the first message is used to instruct the terminal to access an inter-RAT cell.

Specifically, the base station sends the first message to the terminal on an air interface.

More specifically, the base station sends, on a specific time-frequency resource, a terminal identifier carried in the second message, and the terminal reads, at a specific moment, the terminal identifier from the time-frequency resource on which the terminal identifier is sent. If the terminal discovers the terminal identifier corresponding to the terminal, the terminal may initiate a random access process to the base station.

With reference to the first aspect of the embodiments of the present disclosure, in a first implementation of the first aspect of the embodiments of the present disclosure, before the sending, by a base station, a first message to a terminal, the method further includes:

receiving, by the base station, a second message sent by a core network, where the second message includes first indication information, and the first indication information is used to instruct the terminal to access the inter-RAT cell.

Specifically, the base station receives, by using an S1 interface between the base station and the core network, the second message used to page the terminal. The second message includes the first indication information.

When the core network determines that a downlink service needs to be sent to a terminal in an idle mode, the core network needs to initiate paging to the terminal by using the second message.

Specifically, the core network sends the second message to a corresponding base station based on a TAI list of the terminal.

With reference to the first implementation of the first aspect of the embodiments of the present disclosure, in a second implementation of the first aspect of the embodiments of the present disclosure, the second message is used to page the terminal or set up an evolved radio access bearer E-RAB.

In this embodiment, if the core network determines that the terminal needs to access an inter-RAT cell, the first indication information is configured in the second message sent to the base station; and the first indication information may be configured in the second message sent to an inter-RAT base station.

When the terminal and the base station are in a connected mode, the second message sent by the core network to the base station is used to set up the evolved radio access bearer E-RAB.

With reference to the first implementation of the first aspect of the embodiments of the present disclosure or the second implementation of the first aspect of the embodiments of the present disclosure, in a third implementation of the first aspect of the embodiments of the present disclosure, the first indication information includes inter-RAT instruction information, and the inter-RAT instruction information is used to instruct the terminal to select an inter-RAT cell for access, and the sending, by a base station, a first message to a terminal includes:

sending, by the base station to the terminal, the first message that carries the inter-RAT instruction information.

After receiving, on an interface, the second message that includes the first indication information, the base station may generate the first message based on the second message, the base station sends the first message to the terminal on an air interface, and the base station adds the generated inter-RAT instruction information to the first message.

With reference to the first implementation of the first aspect of the embodiments of the present disclosure or the second implementation of the first aspect of the embodiments of the present disclosure, in a fourth implementation of the first aspect of the embodiments of the present disclosure, the first indication information includes inter-RAT service type indication information, and an inter-RAT service type indicated by the inter-RAT service type indication information needs to be transmitted in an inter-RAT cell; and the sending, by a base station, a first message to a terminal includes:

sending, by the base station to the terminal, the first message that carries second indication information, where the second indication information is the inter-RAT service type indication information.

With reference to the first implementation of the first aspect of the embodiments of the present disclosure or the second implementation of the first aspect of the embodiments of the present disclosure, in a fifth implementation of the first aspect of the embodiments of the present disclosure, the first indication information includes inter-RAT service type indication information, and an inter-RAT service type indicated by the inter-RAT service type indication information needs to be transmitted in an inter-RAT cell; and the sending, by a base station, a first message to a terminal includes:

sending, by the base station to the terminal, the first message that carries second indication information, where the second indication information is inter-RAT instruction information, and the inter-RAT instruction information is used to instruct the terminal to select an inter-RAT cell for access.

With reference to the fourth implementation of the first aspect of the embodiments of the present disclosure or the fifth implementation of the first aspect of the embodiments of the present disclosure, in a sixth implementation of the first aspect of the embodiments of the present disclosure, before the sending, by a base station, a first message to a terminal, the method further includes:

adding, by the base station, the second indication information to the first message if the base station determines that the base station cannot carry a service supported by the inter-RAT cell indicated by the first indication information.

With reference to the first aspect of the embodiments of the present disclosure, in a seventh implementation of the first aspect of the embodiments of the present disclosure, if the second message is used to set up an evolved radio access bearer E-RAB, before the sending, by a base station, a first message to a terminal, the method further includes:

receiving, by the base station, a second message sent by a core network, where the second message includes first indication information, and the first indication information is used to indicate a quality of service QoS parameter.

With reference to the seventh implementation of the first aspect of the embodiments of the present disclosure, in an eighth implementation of the first aspect of the embodiments of the present disclosure, before the sending, by a base station, a first message to a terminal, the method further includes:

receiving, by the base station, an inter-RAT cell measurement report sent by the terminal; and the sending, by a base station, a first message to a terminal includes:

sending, by the base station, the first message that includes an inter-RAT cell identifier to the terminal.

With reference to the eighth implementation of the first aspect of the embodiments of the present disclosure, in a ninth implementation of the first aspect of the embodiments of the present disclosure, before the receiving, by the base station, an inter-RAT cell measurement report sent by the terminal, the method further includes:

sending, by the base station, a measurement report request to the terminal, where the measurement report request includes inter-RAT instruction information, and the inter-RAT instruction information is used to instruct the terminal to perform inter-RAT cell measurement to generate the inter-RAT cell measurement report.

With reference to the method in any one of the first aspect of the embodiments of the present disclosure to the ninth implementation of the first aspect of the embodiments of the present disclosure, in a tenth implementation of the first aspect of the embodiments of the present disclosure, the inter-RAT cell is a cell that supports a new radio access technology new RAT, a 2G cell, or a 3G cell.

A second aspect of embodiments of the present disclosure provides a method for accessing an inter-RAT cell, including:

receiving, by a terminal, a first message sent by a base station, where the first message is used to instruct the terminal to access an inter-RAT cell; and accessing, by the terminal based on the first message, an inter-RAT cell selected by the terminal.

With reference to the second aspect of the embodiments of the present disclosure, in a first implementation of the second aspect of the embodiments of the present disclosure, the receiving, by a terminal, a first message sent by a base station includes:

receiving, by the terminal, the first message that is sent by the base station and that includes inter-RAT instruction information, where the inter-RAT instruction information is used to instruct the terminal to select an inter-RAT cell for access; and the accessing, by the terminal based on the first message, an inter-RAT cell selected by the terminal includes:

accessing, by the terminal, the selected inter-RAT cell according to the inter-RAT instruction information.

With reference to the first implementation of the second aspect of the embodiments of the present disclosure, in a second implementation of the second aspect of the embodiments of the present disclosure, the receiving, by a terminal, a first message sent by a base station includes:

receiving, by the terminal, the first message that is sent by the base station and that carries second indication information, where the second indication information is inter-RAT service type indication information; and the accessing, by the terminal based on the first message, an inter-RAT cell selected by the terminal includes:

accessing, by the terminal according to the second indication information, the inter-RAT cell selected by the terminal.

With reference to the second aspect of the embodiments of the present disclosure, in a third implementation of the second aspect of the embodiments of the present disclosure, before the receiving, by a terminal, a first message sent by a base station, the method further includes:

sending, by the terminal, an inter-RAT cell measurement report to the base station;

the receiving, by a terminal, a first message sent by a base station includes:

receiving, by the terminal, the first message that is sent by the base station and that includes an inter-RAT cell identifier; and the accessing, by the terminal based on the first message, an inter-RAT cell selected by the terminal includes:

accessing, by the terminal based on the inter-RAT cell identifier, an inter-RAT cell corresponding to the inter-RAT cell identifier.

With reference to the third implementation of the second aspect of the embodiments of the present disclosure, in a fourth implementation of the second aspect of the embodiments of the present disclosure, before the sending, by the terminal, an inter-RAT cell measurement report to the base station, the method further includes:

receiving, by the terminal, a measurement report request sent by the base station, where the measurement report request includes inter-RAT instruction information; and performing, by the terminal, inter-RAT cell measurement according to the inter-RAT instruction information to generate the inter-RAT cell measurement report.

With reference to the method in any one of the second aspect of the embodiments of the present disclosure to the fourth implementation of the second aspect of the embodiments of the present disclosure, in a fifth implementation of the second aspect of the embodiments of the present disclosure, the inter-RAT cell is a cell that supports a new radio access technology new RAT, a 2G cell, or a 3G cell.

A third aspect of embodiments of the present disclosure provides a method for accessing an inter-RAT cell, including:

sending, by a core network, a second message to a base station, so that the base station sends a first message to a terminal based on the second message, where the first message is used to instruct the terminal to access an inter-RAT cell.

With reference to the third aspect of the embodiments of the present disclosure, in a first implementation of the third aspect of the embodiments of the present disclosure, the sending, by a core network, a second message to a base station includes:

sending, by the core network, the second message that includes first indication information to the base station, where the first indication information is used to instruct the terminal to access the inter-RAT cell.

With reference to the first implementation of the third aspect of the embodiments of the present disclosure, in a second implementation of the third aspect of the embodiments of the present disclosure, the sending, by a core network, a second message to a base station includes:

sending, by the core network to the base station, the second message that is used to page the terminal or set up an evolved radio access bearer E-RAB.

With reference to the first implementation of the third aspect of the embodiments of the present disclosure or the second implementation of the third aspect of the embodiments of the present disclosure, in a third implementation of the third aspect of the embodiments of the present disclosure, the first indication information includes inter-RAT instruction information, and the inter-RAT instruction information is used to instruct the terminal to select an inter-RAT cell for access.

With reference to the first implementation of the third aspect of the embodiments of the present disclosure or the second implementation of the third aspect of the embodiments of the present disclosure, in a fourth implementation of the third aspect of the embodiments of the present disclosure, the first indication information includes inter-RAT service type indication information, and an inter-RAT service type indicated by the inter-RAT service type indication information needs to be transmitted in an inter-RAT cell.

With reference to the first implementation of the third aspect of the embodiments of the present disclosure or the second implementation of the third aspect of the embodiments of the present disclosure, in a fifth implementation of the third aspect of the embodiments of the present disclosure, if the second message is used to set up an evolved radio access bearer E-RAB, the first indication information is used to indicate a quality of service QoS parameter.

With reference to the method in any one of the third aspect of the embodiments of the present disclosure to the fifth implementation of the third aspect of the embodiments of the present disclosure, in a sixth implementation of the third aspect of the embodiments of the present disclosure, the inter-RAT cell is a cell that supports a new radio access technology new RAT, a 2G cell, or a 3G cell.

A fourth aspect of embodiments of the present disclosure provides a base station, including:

a first sending unit, configured to send a first message to a terminal, where the first message is used to instruct the terminal to access an inter-RAT cell.

With reference to the fourth aspect of the embodiments of the present disclosure, in a first implementation of the fourth aspect of the embodiments of the present disclosure, the base station further includes:

a first receiving unit, configured to receive a second message sent by a core network, where the second message includes first indication information, and the first indication information is used to instruct the terminal to access the inter-RAT cell.

With reference to the first implementation of the fourth aspect of the embodiments of the present disclosure, in a second implementation of the fourth aspect of the embodiments of the present disclosure, the second message is used to page the terminal or set up an evolved radio access bearer E-RAB.

With reference to the fourth aspect of the embodiments of the present disclosure or the first implementation of the fourth aspect of the embodiments of the present disclosure, in a second implementation of the fourth aspect of the embodiments of the present disclosure, the first indication information includes inter-RAT instruction information, and the inter-RAT instruction information is used to instruct the terminal to select an inter-RAT cell for access; and the first sending unit is further configured to send, to the terminal, the first message that carries the inter-RAT instruction information.

With reference to the fourth aspect of the embodiments of the present disclosure or the first implementation of the fourth aspect of the embodiments of the present disclosure, in a third implementation of the fourth aspect of the embodiments of the present disclosure, the first indication information includes inter-RAT service type indication information, and an inter-RAT service type indicated by the inter-RAT service type indication information needs to be transmitted in an inter-RAT cell; and the first sending unit is further configured to send, to the terminal, the first message that carries second indication information, where the second indication information is the inter-RAT service type indication information.

With reference to the fourth aspect of the embodiments of the present disclosure or the first implementation of the fourth aspect of the embodiments of the present disclosure, in a fourth implementation of the fourth aspect of the embodiments of the present disclosure, the first indication information includes inter-RAT service type indication information, and an inter-RAT service type indicated by the inter-RAT service type indication information needs to be transmitted in an inter-RAT cell; and the first sending unit is further configured to send, to the terminal, the first message that carries second indication information, where the second indication information is inter-RAT instruction information, and the inter-RAT instruction information is used to instruct the terminal to select an inter-RAT cell for access.

With reference to the third implementation of the fourth aspect of the embodiments of the present disclosure or the fourth implementation of the fourth aspect of the embodiments of the present disclosure, in a fifth implementation of the fourth aspect of the embodiments of the present disclosure, the base station further includes:

a first determining unit, configured to add the second indication information to the first message if determining that the base station cannot carry a service supported by the inter-RAT cell indicated by the first indication information.

With reference to the fourth aspect of the embodiments of the present disclosure, in a sixth implementation of the fourth aspect of the embodiments of the present disclosure, if the second message is used to set up an evolved radio access bearer E-RAB, the base station further includes:

a second receiving unit, configured to receive a second message sent by a core network, where the second message includes first indication information, and the first indication information is used to indicate a quality of service QoS parameter.

With reference to the sixth implementation of the fourth aspect of the embodiments of the present disclosure, in a seventh implementation of the fourth aspect of the embodiments of the present disclosure, the base station further includes:

a third receiving unit, configured to receive an inter-RAT cell measurement report sent by the terminal, where the first sending unit is further configured to send the first message that includes an inter-RAT cell identifier to the terminal.

With reference to the seventh implementation of the fourth aspect of the embodiments of the present disclosure, in an eighth implementation of the fourth aspect of the embodiments of the present disclosure, the base station further includes:

a second sending unit, configured to send a measurement report request to the terminal, where the measurement report request includes inter-RAT instruction information, and the inter-RAT instruction information is used to instruct the terminal to perform inter-RAT cell measurement to generate the inter-RAT cell measurement report.

With reference to the seventh implementation of the fourth aspect of the embodiments of the present disclosure to the eighth implementation of the fourth aspect of the embodiments of the present disclosure, in a ninth implementation of the fourth aspect of the embodiments of the present disclosure, the inter-RAT cell is a cell that supports a new radio access technology new RAT, a 2G cell, or a 3G cell.

A fifth aspect of embodiments of the present disclosure provides a terminal, including:

a fourth receiving unit, configured to receive a first message sent by a base station, where the first message is used to instruct the terminal to access an inter-RAT cell; and a second determining unit, configured to access, based on the first message, an inter-RAT cell selected by the terminal.

With reference to the fifth aspect of the embodiments of the present disclosure, in a first implementation of the fifth aspect of the embodiments of the present disclosure, the fourth receiving unit is further configured to receive the first message that is sent by the base station and that includes inter-RAT instruction information, where the inter-RAT instruction information is used to instruct the terminal to select an inter-RAT cell for access; and the second determining unit is further configured to access the selected inter-RAT cell according to the inter-RAT instruction information.

With reference to the fifth aspect of the embodiments of the present disclosure, in a second implementation of the fifth aspect of the embodiments of the present disclosure, the fourth receiving unit is further configured to receive the first message that is sent by the base station and that carries second indication information, where the second indication information is inter-RAT service type indication information; and the second determining unit is further configured to access, according to the second indication information, the inter-RAT cell selected by the terminal.

With reference to the fifth aspect of the embodiments of the present disclosure, in a third implementation of the fifth aspect of the embodiments of the present disclosure, the terminal further includes:

a third sending unit, configured to send an inter-RAT cell measurement report to the base station, where the fourth receiving unit is further configured to receive the first message that is sent by the base station and that includes an inter-RAT cell identifier; and the second determining unit is further configured to access, based on the inter-RAT cell identifier, an inter-RAT cell corresponding to the inter-RAT cell identifier.

With reference to the third implementation of the fifth aspect of the embodiments of the present disclosure, in a fourth implementation of the fifth aspect of the embodiments of the present disclosure, the terminal further includes:

a fifth receiving unit, configured to receive a measurement report request sent by the base station, where the measurement report request includes inter-RAT instruction information; and a measurement unit, configured to perform inter-RAT cell measurement according to the inter-RAT instruction information to generate the inter-RAT cell measurement report.

With reference to the terminal in any one of the fifth aspect of the embodiments of the present disclosure to the fourth implementation of the fifth aspect of the embodiments of the present disclosure, in a fifth implementation of the fifth aspect of the embodiments of the present disclosure, the inter-RAT cell is a cell that supports a new radio access technology new RAT, a 2G cell, or a 3G cell.

A sixth aspect of embodiments of the present disclosure provides a core network, including:

a fourth sending unit, configured to send a second message to a base station, so that the base station sends a first message to a terminal based on the second message, where the first message is used to instruct the terminal to access an inter-RAT cell.

With reference to the sixth aspect of the embodiments of the present disclosure, in a first implementation of the sixth aspect of the embodiments of the present disclosure, the fourth sending unit is further configured to send the second message that includes first indication information to the base station, where the first indication information is used to instruct the terminal to access the inter-RAT cell.

With reference to the first implementation of the sixth aspect of the embodiments of the present disclosure, in a second implementation of the sixth aspect of the embodiments of the present disclosure, the fourth sending unit is further configured to send, to the base station, the second message that is used to page the terminal or set up an evolved radio access bearer E-RAB.

With reference to the first implementation of the sixth aspect of the embodiments of the present disclosure or the second implementation of the sixth aspect of the embodiments of the present disclosure, in a third implementation of the sixth aspect of the embodiments of the present disclosure, the first indication information sent by the fourth sending unit includes inter-RAT instruction information, and the inter-RAT instruction information is used to instruct the terminal to select an inter-RAT cell for access.

With reference to the first implementation of the sixth aspect of the embodiments of the present disclosure or the second implementation of the sixth aspect of the embodiments of the present disclosure, in a fourth implementation of the sixth aspect of the embodiments of the present disclosure, the first indication information sent by the fourth sending unit includes inter-RAT service type indication information, and an inter-RAT service type indicated by the inter-RAT service type indication information needs to be transmitted in an inter-RAT cell.

With reference to the first implementation of the sixth aspect of the embodiments of the present disclosure or the second implementation of the sixth aspect of the embodiments of the present disclosure, in a fifth implementation of the sixth aspect of the embodiments of the present disclosure, if the second message is used to set up an evolved radio access bearer E-RAB, the first indication information sent by the fourth sending unit is used to indicate a quality of service QoS parameter.

With reference to the core network in any one of the sixth aspect of the embodiments of the present disclosure to the fifth implementation of the sixth aspect of the embodiments of the present disclosure, in a sixth implementation of the sixth aspect of the embodiments of the present disclosure, the inter-RAT cell is a cell that supports a new radio access technology new RAT, a 2G cell, or a 3G cell.

A seventh aspect of embodiments of the present disclosure provides a base station, including:

one or more processors, a memory, a bus system, and one or more programs, where the processor is connected to the memory by using the bus system; and the one or more programs are stored in the memory, the one or more programs include an instruction, and when the instruction is executed by the base station, the base station performs the method in any one of the first aspect of the embodiments of the present disclosure to the tenth implementation of the first aspect of the embodiments of the present disclosure.

An eighth aspect of the embodiments of the present disclosure provides a terminal, including:

one or more processors, a memory, a bus system, and one or more programs, where the processor is connected to the memory by using the bus system; and the one or more programs are stored in the memory, the one or more programs include an instruction, and when the instruction is executed by the terminal, the terminal performs the method in any one of the second aspect of the embodiments of the present disclosure to the fifth implementation of the second aspect of the embodiments of the present disclosure.

A ninth aspect of embodiments of the present disclosure provides a core network, including:

one or more processors, a memory, a bus system, and one or more programs, where the processor is connected to the memory by using the bus system; and the one or more programs are stored in the memory, the one or more programs include an instruction, and when the instruction is executed by the core network, the core network performs the method in any one of the third aspect of the embodiments of the present disclosure to the sixth implementation of the third aspect of the embodiments of the present disclosure.

The present disclosure provides a method for accessing an inter-RAT cell and a related device, and the method includes:

sending, by a base station, a first message to a terminal, where the first message is used to instruct the terminal to access an inter-RAT cell. In this embodiment, the first message is sent to the terminal, so that the terminal directly accesses an inter-RAT cell that can meet a service QoS requirement, thereby avoiding a service transmission failure that results from incapability of meeting the service QoS requirement, ensuring that the service QoS requirement can be met, and reducing a delay caused by re-access.

DESCRIPTION OF EMBODIMENTS

Embodiments of the present disclosure provide a method for accessing an inter-RAT cell, to effectively guarantee successful data transmission and reduce a transmission delay. The method for accessing an inter-RAT cell in the embodiments is based on a network architecture in FIG. 2.

Figure 1:
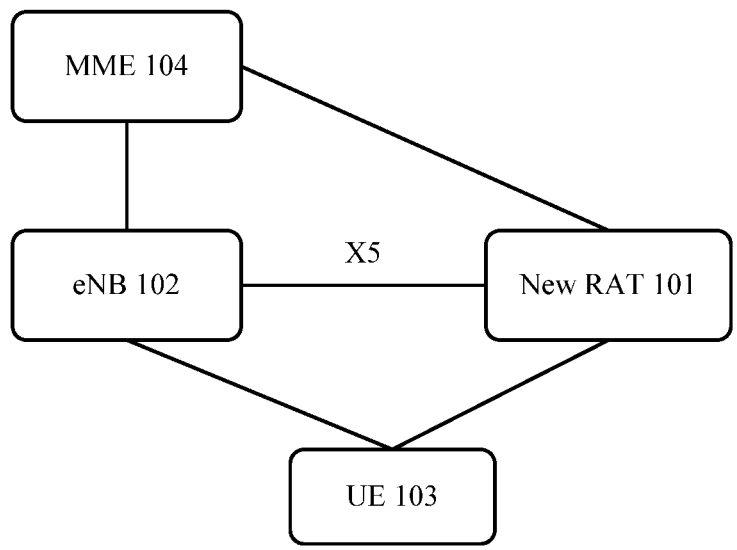
FIG. 1 is a schematic structural diagram of an LTE system according to the prior art.
Figure 2:
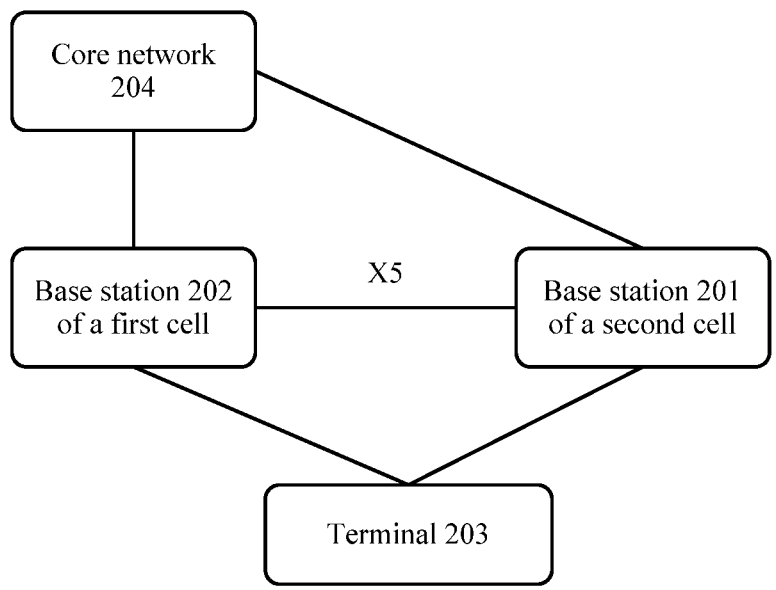
FIG. 2 is a schematic diagram of a network architecture according to an embodiment of the present disclosure.

It can be learned from FIG. 2 that the network architecture in this embodiment includes a terminal 203, a base station 202, a base station 201, and a core network 204.

The two base stations in this embodiment support different standards, that is, cells of the two base stations are inter-RAT cells.

Specifically, in this embodiment, the base station 201 is an LTE base station, and there is an LTE cell of the LTE base station. The base station 202 is a new radio access technology new RAT (NR) base station, and there is an NR cell of the NR base station. For example, a 2G or 3G standard may be alternatively supported, and this is not limited in the present disclosure.

Specifically, in this embodiment, that the core network 204 is a mobility management entity MME is used as an example for description. The mobility management entity may alternatively be another device that has a similar function in an NR core network. This is not limited in the present disclosure.

An overlapping area exists between an area covered by the LTE cell on which the terminal 203 in this embodiment camps and an area covered by the New RAT cell (NR cell), and the terminal 203 in this embodiment camps in the overlapping area between the LTE cell and the NR cell. That is, the terminal 203 in this embodiment can support both LTE air interface transmission and New RAT air interface transmission.

Although the terminal 203 in this embodiment camps on the LTE cell, an LTE air interface cannot meet a QoS requirement of a service that currently initiates paging.

A technical problem resolved by the method for accessing an inter-RAT cell in the present disclosure is as follows: When the terminal camps on the LTE cell, a network side initiates a new service, and a new radio access technology (New RAT) air interface is required to ensure a QoS requirement of the new service. That is, the terminal needs to establish a connection to a base station that supports the new RAT (inter-RAT cell base station), to perform data transmission of the new service. In this way, in the method for accessing an inter-RAT cell in the embodiments, the terminal can be instructed to access the base station that supports the new RAT, so that the terminal can successfully perform data transmission of a new RAT service.

The following cell access procedure is performed in the foregoing application scenario.

Figure 3:
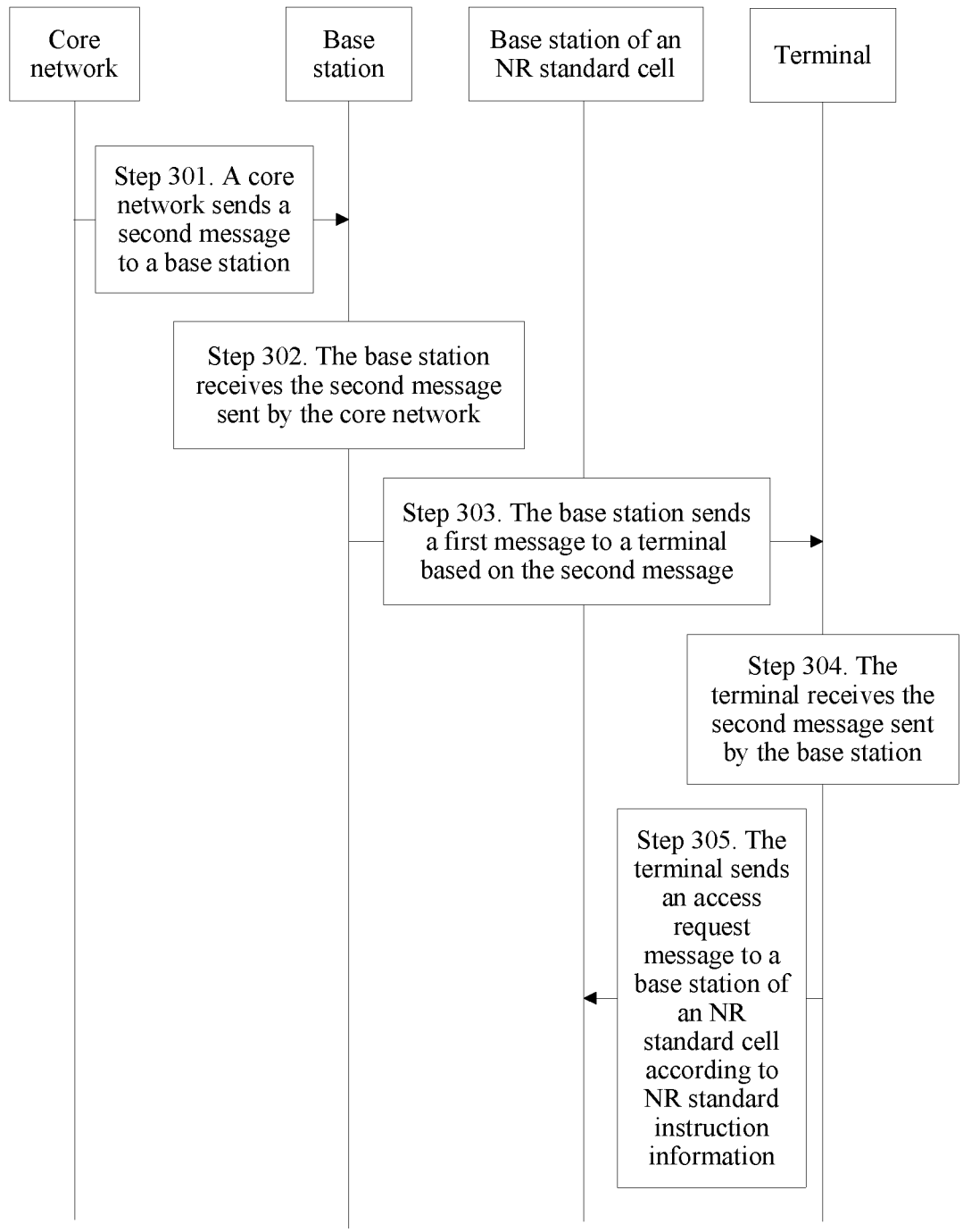
FIG. 3 is a flowchart of steps of an embodiment of a method for accessing an inter-RAT cell according to the present disclosure.

With reference to FIG. 3, the following describes steps of a method for accessing an inter-RAT cell according to an embodiment of the present disclosure.

It should be noted that in this embodiment, a terminal in an idle mode is used as an example for description, and the method for accessing an inter-RAT cell in this embodiment can enable the terminal in an idle mode to access a second cell.

The method for accessing an inter-RAT cell includes the following steps.

Step 301: A core network sends a second message to a base station.

In this embodiment, the second message is used to page the terminal, and the terminal in this embodiment is a terminal that supports a new radio access technology new RAT.

In this embodiment, when the core network determines that a downlink service needs to be sent to the terminal in an idle mode, the core network needs to initiate paging to the terminal by using the second message.

Specifically, the core network sends the second message to a corresponding base station based on a TAI list of the terminal, and the base station may include only an LTE base station, or may include both an LTE base station and an NR base station.

In this embodiment, if the core network determines that the terminal needs to access an NR cell, first indication information is configured in the second message sent to the LTE base station; and the first indication information may be or may not be configured in the second message sent to the NR base station. This is not limited in the present disclosure.

In this embodiment, the first indication information configured by the core network includes NR standard instruction information, and the NR standard instruction information is used to instruct the terminal to access the NR cell.

Step 302: The base station receives the second message sent by the core network.

Specifically, the base station receives, by using an S1 interface between the base station and a mobility management entity MME, the second message used to page the terminal. The second message includes the first indication information.

It should be noted that if the MME is replaced by another device that has a function similar to that of the MME, an interface other than the S1 interface may be used. This is not limited in the present disclosure.

When the core network needs to page the terminal, the core network triggers a paging process, and a base station of an LTE cell on which the terminal camps can receive the second message sent by the core network.

Specifically, to implement paging on the terminal, the second message in this embodiment includes an identifier of the terminal, and the terminal identifier corresponds to the terminal.

Step 303: The base station sends a first message to the terminal based on the second message.

In this embodiment, the core network sends the second message to the base station on an interface. After receiving, on the interface, the second message that includes the first indication information, the base station may generate the first message based on the second message, and the base station sends the first message to the terminal on an air interface.

More specifically, the base station sends, on a specific time-frequency resource, the terminal identifier carried in the second message, and the terminal reads, at a specific moment, the terminal identifier from the time-frequency resource on which the terminal identifier is sent. If the terminal discovers the terminal identifier corresponding to the terminal, the terminal may initiate a random access process to the base station. If the first indication information included in the second message sent by the core network includes the NR standard instruction information, the base station may send, to the terminal, the first message that carries the NR standard instruction information.

The NR standard instruction information is used to instruct the terminal to select an NR standard cell for access.

Specifically, the second message in this embodiment may be a paging message, and the paging message carries the first indication information and the terminal identifier.

Step 304: The terminal receives the first message sent by the base station.

The first message in this embodiment carries the NR standard instruction information.

Step 305: The terminal sends an access request message to a base station of an NR standard cell according to NR standard instruction information.

Specifically, the terminal selects an NR standard cell for access according to the NR standard instruction information.

The NR standard instruction information sent by the base station on which the terminal currently camps to the terminal is used to instruct the terminal to select an NR standard cell for access, and the terminal performs, according to the NR standard instruction information, a procedure of selecting an NR standard cell.

Specifically, that the terminal performs, according to the NR standard instruction information, the procedure of selecting an NR standard cell may be as follows: After receiving the NR standard instruction information, the terminal may determine that a proper NR standard cell needs to be selected, the terminal may measure different NR standard cells to generate measurement information, and select a proper NR standard cell for access based on measurement information of each NR standard cell, and the terminal may access an NR standard cell of the proper NR standard cell. It should be noted that the procedure of selecting an NR standard cell according to the NR standard instruction information may be performed in another manner, and this is not limited in the present disclosure.

In this embodiment, the terminal may access the NR standard cell selected by the terminal according to the NR standard instruction information.

The terminal sends the access request message to the base station of the NR standard cell.

The terminal sends the access request message to the base station of the NR standard cell, so that the terminal and the base station of the NR standard cell can be connected by using a random access process, and data transmission can be performed between the terminal and the base station of the inter-RAT cell.

For the random access process, refer to the prior art. Details are not described in this embodiment.

Beneficial effects of this embodiment are as follows: The first message that carries inter-RAT instruction information is sent to the terminal, so that the terminal directly accesses an NR cell that can meet a service QoS requirement, thereby avoiding a service transmission failure that results from incapability of meeting the service QoS requirement, ensuring that the service QoS requirement can be met, and reducing a delay caused by re-access.

The embodiment in FIG. 3 describes how a terminal in an idle mode performs access according to NR standard instruction information. With reference to an embodiment in FIG. 4, the following describes how a terminal in an idle mode accesses, according to NR standard service type indication information or NR standard instruction information, an inter-RAT cell selected by the terminal.

Step 401: A core network sends a second message to a base station.

For a specific execution process of step 401 in this embodiment, refer to step 301. A difference between step 401 and step 301 is that first indication information configured in the second message by the core network in this embodiment includes NR standard service type indication information.

An NR standard service type indicated by the NR standard service type indication information needs to be transmitted in an NR cell.

Step 402: The base station receives the second message sent by the core network.

The second message in this embodiment includes the NR standard service type indication information.

For a specific execution process of step 402 in this embodiment, refer to the specific execution process of step 302 in FIG. 3. Details are not described in this embodiment again.

Step 403: The base station determines whether the base station can carry an NR standard service type indicated by first indication information, and if no, performs step 404.

In this embodiment, the base station determines, based on the second message sent by the core network, the NR standard service type indicated by the first indication information, and the base station determines, based on a service type that can be supported by the base station, whether the base station can support the NR standard service type.

Specifically, in this embodiment, if the base station is an LTE base station and supports only an LTE service but cannot support an NR service, the base station determines that the base station cannot carry a service supported by an NR cell indicated by the first indication information. In this case, step 404 is then performed.

Step 404: The base station adds second indication information to a first message.

In this embodiment, when the base station determines, according to the NR service type indication information, that the base station cannot support a service indicated by the NR service type indication information, the base station adds the second indication information to the first message.

The second indication information is the NR standard service type indication information, and the NR service type indicated by the NR service type indication information needs to be transmitted in an NR cell.

Alternatively, the second indication information is NR standard instruction information, and the NR instruction information is used to instruct the terminal to select an NR cell for access.

Step 405: The base station sends, to the terminal, the first message that carries the second indication information.

In this embodiment, the second indication information is the NR standard service type indication information or the NR standard instruction information.

Step 406: The terminal receives the second message sent by the base station.

In this embodiment, the second message received by the terminal includes the second indication information, and the second indication information is the NR standard service type indication information or the NR standard instruction information.

Step 407: The terminal sends an access request message to a selected base station of an NR standard cell according to the second indication information.

Specifically, the terminal selects the NR cell according to the second indication information.

More specifically, the terminal can perform, according to the received second indication information, a procedure of selecting the base station of the NR cell.

Specifically, that the terminal performs, according to the NR service type indication information or the NR instruction information included in the second indication information, the procedure of selecting the base station of the NR cell may be as follows: After receiving the NR service type indication information or the NR instruction information, the terminal may determine that a proper NR cell needs to be selected, the terminal may measure different NR cells to generate measurement information, and select a proper NR cell for access based on measurement information of each NR cell, and the terminal may access a base station of the proper NR cell.

The terminal accesses the selected NR cell.

In this embodiment, the terminal may access the NR cell selected by the terminal according to the NR service type indication information or the NR instruction information.

Beneficial effects of this embodiment are as follows: The first message that carries the NR standard service type indication information or the NR standard instruction information is sent to the terminal, so that the terminal directly accesses an NR cell that can meet a service QoS requirement, thereby avoiding a service transmission failure that results from incapability of meeting the service QoS requirement, ensuring that the service QoS requirement can be met, and reducing a delay caused by re-access.

Figure 4:
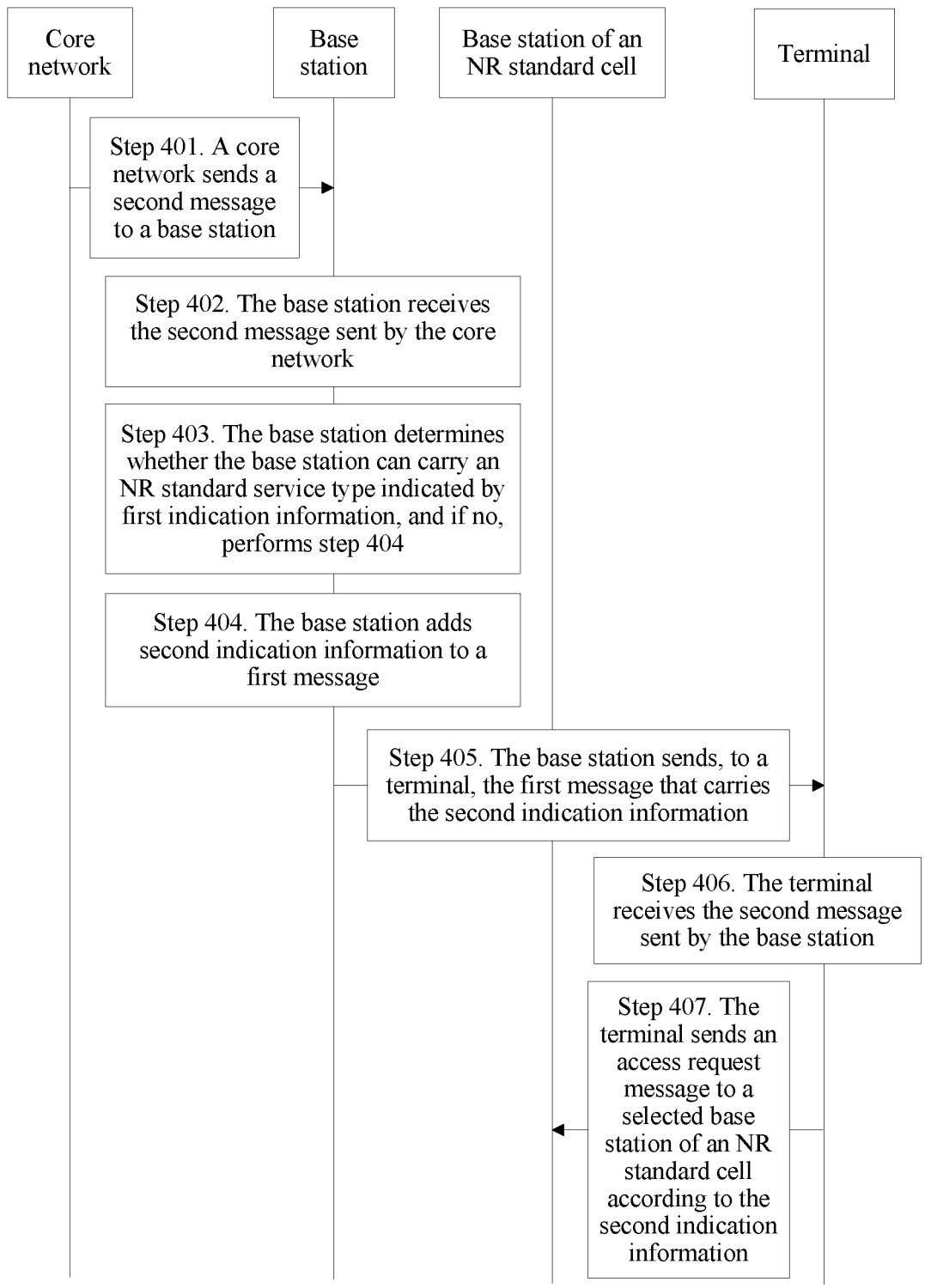
FIG. 4 is a flowchart of steps of another embodiment of a method for accessing an inter-RAT cell according to the present disclosure.
Figure 5A:
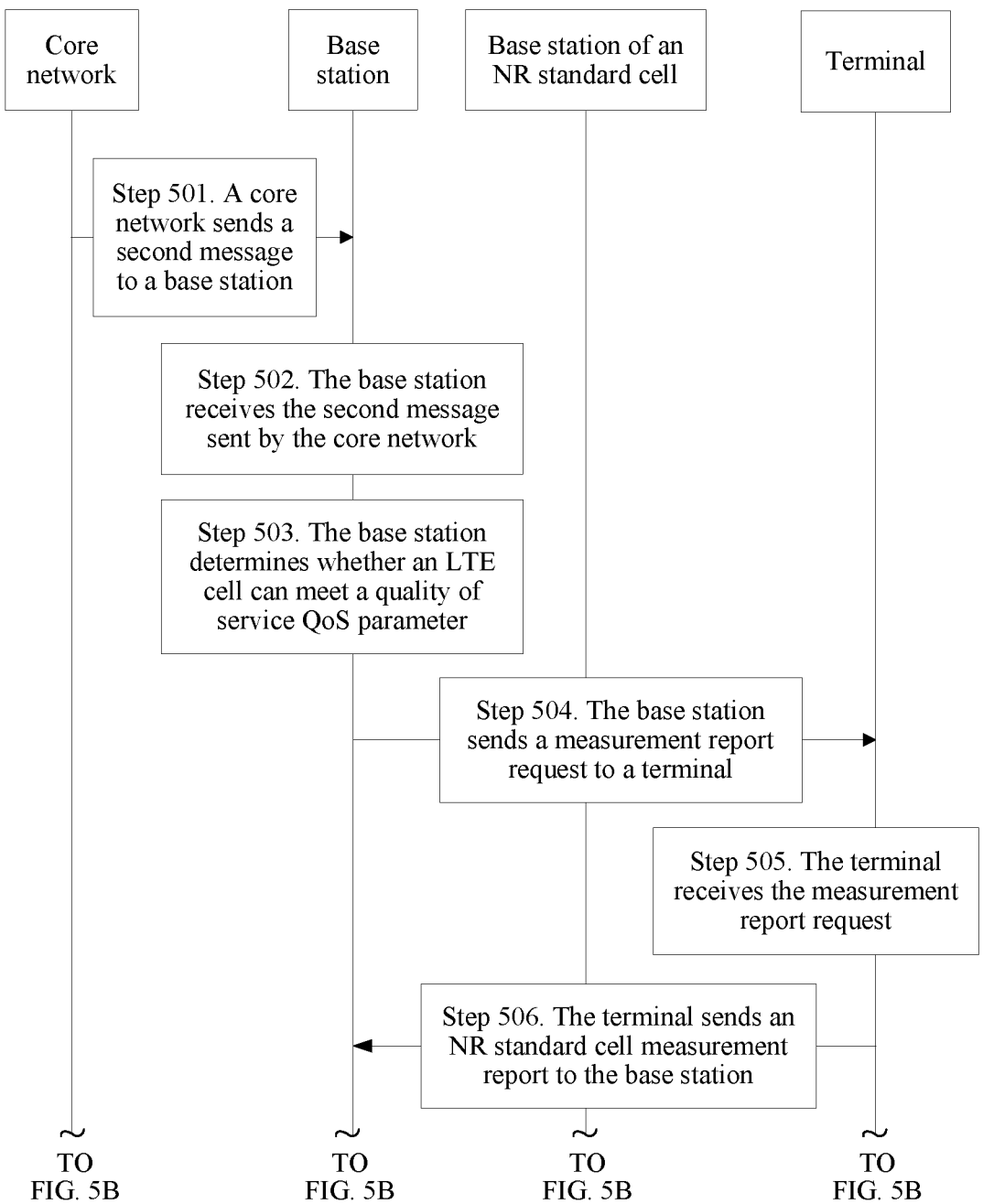
FIG. 5A and FIG. 5B are a flowchart of steps of another embodiment of a method for accessing an inter-RAT cell according to the present disclosure.
Figure 5B:
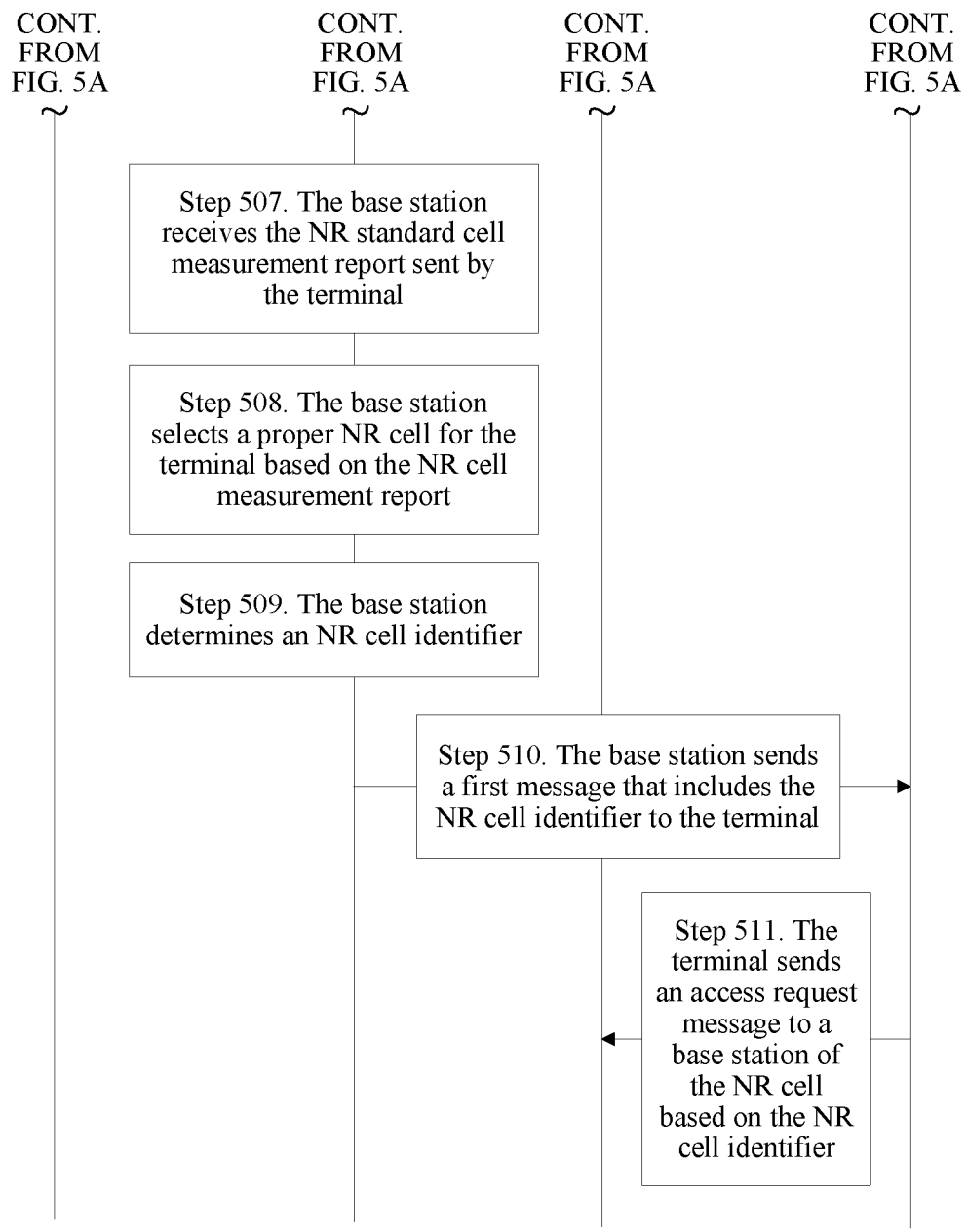

The embodiments in FIG. 3 and FIG. 4 describe how a terminal in an idle mode accesses an NR cell. With reference to FIG. 5A and FIG. 5B, the following describes how a terminal in a connected mode accesses an NR cell.

Step 501: A core network sends a second message to a base station.

In this embodiment, that the terminal and an LTE cell are in a connected mode is used as an example. For example, in this embodiment, the second message sent by the core network to the base station is used to set up an evolved radio access bearer E-RAB, and the second message is an E-RAB setup request message. In an NR system, the second message may be of another message type, and this is not limited in the present disclosure.

The second message in this embodiment includes first indication information, and the first indication information is used to indicate a quality of service QoS parameter.

Step 502: The base station receives the second message sent by the core network, where the second message includes first indication information.

Specifically, the base station receives, by using an S1 interface between the base station and a mobility management entity MME, the second message used to indicate the quality of service QoS parameter. It should be noted that if the MME is replaced by another device that has a function similar to that of the MME, an interface other than the S1 interface may be used. This is not limited in the present disclosure.

Step 503: The base station determines whether an LTE cell can meet a quality of service QoS parameter.

In this embodiment, after receiving the second message sent by the core network, an LTE cell on which the terminal currently camps determines, based on the quality of service QoS parameter indicated by the first indication information included in the second message, whether the base station meets the quality of service QoS parameter, and if no, step 504 is performed.

Step 504: The base station sends a measurement report request to the terminal.

Specifically, in this embodiment, if the base station determines that the LTE cell cannot meet the quality of service QoS parameter, the base station sends the measurement report request that includes NR standard instruction information to the terminal.

Step 505: The terminal receives the measurement report request.

The terminal performs NR standard cell measurement based on measurement information, and generates an NR indication cell measurement report based on a measurement result.

Step 506: The terminal sends an NR standard cell measurement report to the base station.

Step 507: The base station receives the NR standard cell measurement report sent by the terminal.

Step 508: The base station selects a proper NR cell for the terminal based on the NR cell measurement report.

In this embodiment, when the base station determines that the LTE cell cannot meet the quality of service QoS parameter, the base station may select an NR cell based on the NR cell measurement report sent by the terminal.

Step 509: The base station determines an NR cell identifier.

Specifically, the base station selects an NR cell identifier based on the NR standard cell measurement report, and the NR cell identifier corresponds to the NR cell selected by the base station.

Step 510: The base station sends a first message that includes the NR cell identifier to the terminal.

In this embodiment, the core network sends the second message to the base station on an interface. After receiving the second message on the interface, the LTE cell may generate the first message based on the second message, and the base station sends the first message to the terminal on an air interface.

Step 511: The terminal sends an access request message to a base station of the NR cell based on the NR cell identifier.

Specifically, the terminal receives the first message that is sent by the base station and that includes the NR cell identifier.

The terminal accesses the NR cell based on the NR cell identifier.

In this embodiment, the terminal can determine the NR cell corresponding to the NR cell identifier, so that the terminal can access the NR cell corresponding to the NR cell identifier.

The terminal sends the access request message to the base station of the NR cell, so that the terminal and the base station of the NR cell can be connected by using a random access process, and data transmission can be performed between the terminal and the base station of the NR cell.

Beneficial effects of this embodiment are as follows: The first message that carries the NR cell identifier is sent to the terminal, so that the terminal directly accesses an NR cell that can meet a service QoS requirement, thereby avoiding a service transmission failure that results from incapability of meeting the service QoS requirement, ensuring that the service QoS requirement can be met, and reducing a delay caused by re-access.

Figure 6:
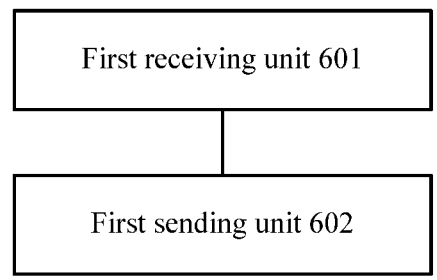
FIG. 6 is a schematic structural diagram of an embodiment of a base station according to the present disclosure.

The following describes an embodiment of a structure of a base station according to the present disclosure with reference to FIG. 6. The base station in FIG. 6 is configured to implement a procedure of accessing an inter-RAT cell in FIG. 3. For a process in which the base station implements access to an inter-RAT cell, refer to FIG. 3. Details are not described in this embodiment.

The base station in this embodiment includes a first receiving unit 601 and a first sending unit 602.

The first receiving unit 601 is configured to receive a second message sent by a core network, where the second message includes first indication information, and the first indication information is used to instruct a terminal to access an inter-RAT cell.

Specifically, the second message is used to page the terminal.

The first indication information includes inter-RAT instruction information, and the inter-RAT instruction information is used to instruct the terminal to select an inter-RAT cell for access.

The first sending unit 602 is configured to send a first message to the terminal, where the first message is used to instruct the terminal to access the inter-RAT cell.

The first sending unit 602 is further configured to send, to the terminal, the first message that carries the inter-RAT instruction information.

The inter-RAT cell is a cell that supports a new radio access technology new RAT, a 2G cell, or a 3G cell.

The inter-RAT cell in this embodiment is a cell that supports a new radio access technology new RAT, a 2G cell, or a 3G cell.

For beneficial effects of the base station in this embodiment in performing access to an inter-RAT cell, refer to FIG. 3. Details are not described in this embodiment.

Figure 7:
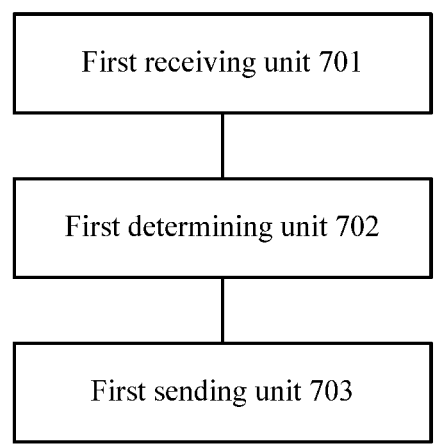
FIG. 7 is a schematic structural diagram of another embodiment of a base station according to the present disclosure.

The following describes an embodiment of a structure of a base station according to the present disclosure with reference to FIG. 7. The base station in FIG. 7 is configured to implement a procedure of accessing an inter-RAT cell in FIG. 4. For a process in which the base station implements access to an inter-RAT cell, refer to FIG. 4. Details are not described in this embodiment.

The base station in this embodiment includes a first receiving unit 701, a first determining unit 702, and a first sending unit 703.

The first receiving unit 701 is configured to receive a second message sent by a core network, where the second message includes first indication information, and the first indication information is used to instruct a terminal to access an inter-RAT cell.

Specifically, the second message is used to page the terminal.

The first indication information includes inter-RAT service type indication information, and an inter-RAT service type indicated by the inter-RAT service type indication information needs to be transmitted in an inter-RAT cell.

Alternatively, the first indication information includes inter-RAT service type indication information, and an inter-RAT service type indicated by the inter-RAT service type indication information needs to be transmitted in an inter-RAT cell.

The first determining unit 702 is configured to add second indication information to a first message if determining that the base station cannot carry a service supported by the inter-RAT cell indicated by the first indication information.

The first sending unit 703 is configured to send the first message to the terminal, where the first message is used to instruct the terminal to access the inter-RAT cell.

Specifically, if the first indication information includes the inter-RAT service type indication information, the first sending unit 703 is further configured to send, to the terminal, the first message that carries the second indication information, where the second indication information is the inter-RAT service type indication information.

Specifically, if the first indication information includes the inter-RAT service type indication information, the first sending unit 703 is further configured to send, to the terminal, the first message that carries the second indication information, where the second indication information is inter-RAT instruction information, and the inter-RAT instruction information is used to instruct the terminal to select an inter-RAT cell for access.

The inter-RAT cell in this embodiment is a cell that supports a new radio access technology new RAT, a 2G cell, or a 3G cell.

For beneficial effects of the base station in this embodiment in performing access to an inter-RAT cell, refer to FIG. 4. Details are not described in this embodiment.

Figure 8:
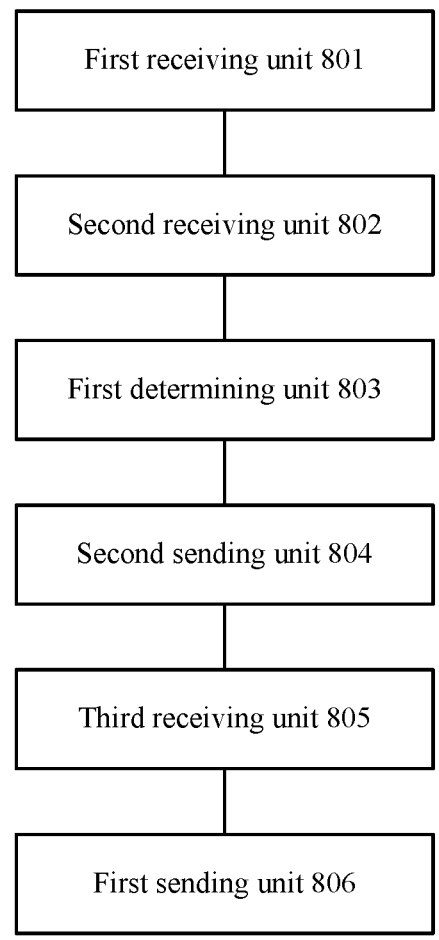
FIG. 8 is a schematic structural diagram of another embodiment of a base station according to the present disclosure.

The following describes an embodiment of a structure of a base station according to the present disclosure with reference to FIG. 8. The base station in FIG. 8 is configured to implement a procedure of accessing an inter-RAT cell in FIG. 5A and FIG. 5B. For a process in which the base station implements access to an inter-RAT cell, refer to FIG. 5A and FIG. 5B. Details are not described in this embodiment.

The base station in this embodiment includes a first receiving unit 801, a second receiving unit 802, a first determining unit 803, a second sending unit 804, a third receiving unit 805, and a first sending unit 806.

The first receiving unit 801 is configured to receive a second message sent by a core network, where the second message includes first indication information, and the first indication information is used to instruct a terminal to access an inter-RAT cell.

Specifically, the second message is used to set up an evolved radio access bearer E-RAB.

The second receiving unit 802 is configured to receive the second message sent by the core network, where the second message includes the first indication information, and the first indication information is used to indicate a quality of service QoS parameter.

The first determining unit 803 is configured to add second indication information to a first message if determining that the base station cannot carry a service supported by the inter-RAT cell indicated by the first indication information.

The second sending unit 804 is configured to send a measurement report request to the terminal, where the measurement report request includes inter-RAT instruction information, and the inter-RAT instruction information is used to instruct the terminal to perform inter-RAT cell measurement to generate an inter-RAT cell measurement report.

The third receiving unit 805 is configured to receive the inter-RAT cell measurement report sent by the terminal.

The first sending unit 806 is configured to send the first message to the terminal, where the first message is used to instruct the terminal to access the inter-RAT cell.

The first sending unit 806 is further configured to send the first message that includes an inter-RAT cell identifier to the terminal.

The inter-RAT cell in this embodiment is a cell that supports a new radio access technology new RAT, a 2G cell, or a 3G cell.

For beneficial effects of the base station in this embodiment in performing access to an inter-RAT cell, refer to FIG. 5A and FIG. 5B. Details are not described in this embodiment.

Figure 9:
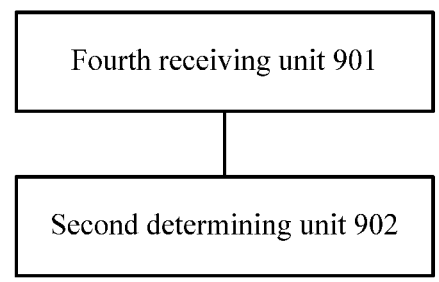
FIG. 9 is a schematic structural diagram of an embodiment of a terminal according to the present disclosure.

The following describes an embodiment of a structure of a terminal according to the present disclosure with reference to FIG. 9. The terminal in FIG. 9 is configured to implement a procedure of accessing an inter-RAT cell in FIG. 3. For a process in which the terminal implements access to an inter-RAT cell, refer to FIG. 3. Details are not described in this embodiment.

The terminal in this embodiment includes a fourth receiving unit 901 and a second determining unit 902.

The fourth receiving unit 901 is configured to receive a first message sent by a base station, where the first message is used to instruct the terminal to access an inter-RAT cell.

The fourth receiving unit 901 is further configured to receive the first message that is sent by the base station and that includes inter-RAT instruction information, where the inter-RAT instruction information is used to instruct the terminal to select an inter-RAT cell for access.

The second determining unit 902 is configured to access, based on the first message, the inter-RAT cell selected by the terminal.

The second determining unit 902 is further configured to access the selected inter-RAT cell according to the inter-RAT instruction information.

The inter-RAT cell in this embodiment is a cell that supports a new radio access technology new RAT, a 2G cell, or a 3G cell.

For beneficial effects of the terminal in this embodiment in performing access to an inter-RAT cell, refer to FIG. 3. Details are not described in this embodiment.

Figure 10:
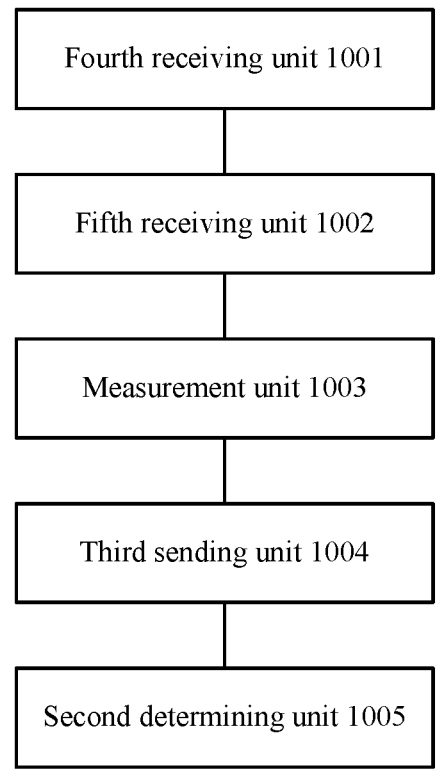
FIG. 10 is a schematic structural diagram of another embodiment of a terminal according to the present disclosure.

The following describes an embodiment of a structure of a terminal according to the present disclosure with reference to FIG. 10. The base station in FIG. 10 is configured to implement a procedure of accessing an inter-RAT cell in FIG. 4. For a process in which the terminal implements access to an inter-RAT cell, refer to FIG. 4. Details are not described in this embodiment.

The terminal in this embodiment includes a fourth receiving unit 1001, a fifth receiving unit 1002, a measurement unit 1003, a third sending unit 1004, and a second determining unit 1005.

The fourth receiving unit 1001 is configured to receive a first message sent by a base station, where the first message is used to instruct the terminal to access an inter-RAT cell.

The fourth receiving unit 1001 is further configured to receive the first message that is sent by the base station and that carries second indication information, where the second indication information is inter-RAT service type indication information.

The fourth receiving unit 1001 is further configured to receive the first message that is sent by the base station and that includes an inter-RAT cell identifier.

The fifth receiving unit 1002 is configured to receive a measurement report request sent by the base station, where the measurement report request includes inter-RAT instruction information.

The measurement unit 1003 is configured to perform inter-RAT cell measurement according to the inter-RAT instruction information to generate an inter-RAT cell measurement report.

The third sending unit 1004 is configured to send the inter-RAT cell measurement report to the base station.

The second determining unit 1005 is configured to access, based on the first message, an inter-RAT cell selected by the terminal.

The second determining unit 1005 is further configured to access, based on the inter-RAT cell identifier, an inter-RAT cell corresponding to the inter-RAT cell identifier.

The inter-RAT cell is a cell that supports a new radio access technology new RAT, a 2G cell, or a 3G cell.

The inter-RAT cell in this embodiment is a cell that supports a new radio access technology new RAT, a 2G cell, or a 3G cell.

For beneficial effects of the terminal in this embodiment in performing access to an inter-RAT cell, refer to FIG. 4. Details are not described in this embodiment.

Figure 11:
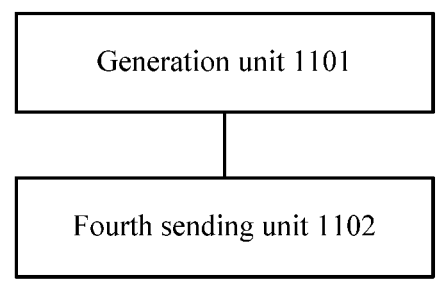
FIG. 11 is a schematic structural diagram of an embodiment of a core network according to the present disclosure.

The following describes an embodiment of a structure of a core network according to the present disclosure with reference to FIG. 11. The core network in FIG. 11 is configured to implement a procedure of accessing an inter-RAT cell in FIG. 3, FIG. 4, or FIG. 5A and FIG. 5B. For a process in which the core network implements access to an inter-RAT cell, refer to FIG. 3, FIG. 4, or FIG. 5A and FIG. 5B. Details are not described in this embodiment.

The core network in this embodiment includes:

a generation unit 1101, configured to generate a second message; and a fourth sending unit 1102, configured to send the second message to a base station, so that the base station sends a first message to a terminal based on the second message, where the first message is used to instruct the terminal to access an inter-RAT cell.

The fourth sending unit 1102 is further configured to send the second message that includes first indication information to the base station, where the first indication information is used to instruct the terminal to access the inter-RAT cell.

Alternatively, the fourth sending unit 1102 is further configured to send, to the base station, the second message that is used to page the terminal or set up an evolved radio access bearer E-RAB.

Alternatively, the first indication information sent by the fourth sending unit 1102 includes inter-RAT instruction information, and the inter-RAT instruction information is used to instruct the terminal to select an inter-RAT cell for access.

Alternatively, the first indication information sent by the fourth sending unit 1102 includes inter-RAT service type indication information, and an inter-RAT service type indicated by the inter-RAT service type indication information needs to be transmitted in an inter-RAT cell.

Alternatively, if the second message is used to set up an evolved radio access bearer E-RAB, the first indication information sent by the fourth sending unit 1102 is used to indicate a quality of service QoS parameter.

The inter-RAT cell is a cell that supports a new radio access technology new RAT, a 2G cell, or a 3G cell.

Figure 12:
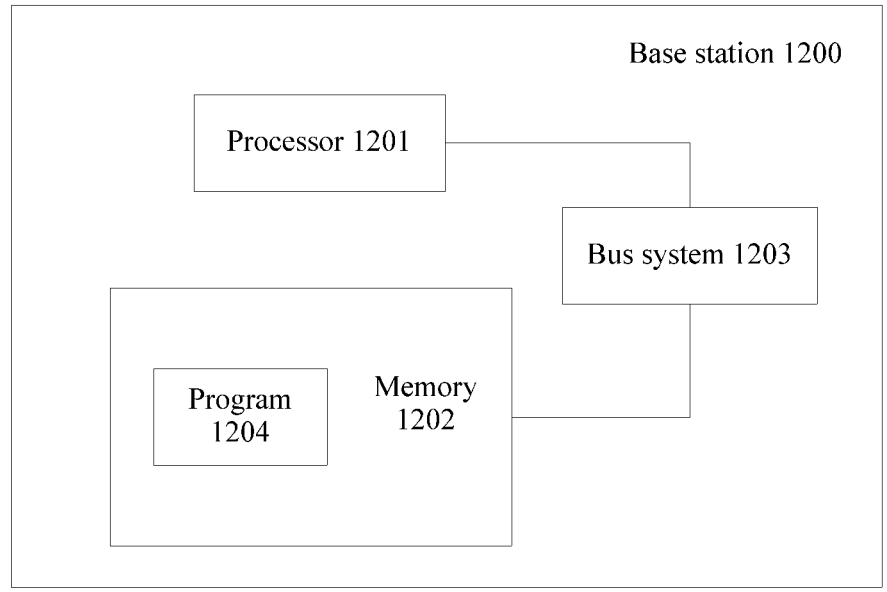
FIG. 12 is a schematic structural diagram of another embodiment of a base station according to the present disclosure.

The specific structure of the base station is described from a perspective of a function module with reference to FIG. 6 to FIG. 8. The following further describes the specific structure of the base station from a perspective of hardware with reference to FIG. 12.

A base station 1200 includes:

one or more processors 1201, a memory 1202, a bus system 1203, and one or more programs 1204, where the processor 1201 is connected to the memory 1202 by using the bus system 1203.

The one or more programs 1204 are stored in the memory 1202, the one or more programs 1204 include an instruction, and when the instruction is executed by the base station 1200, the base station 1200 performs the method in any embodiment in FIG. 3 to FIG. 5A and FIG. 5B.

Figure 13:
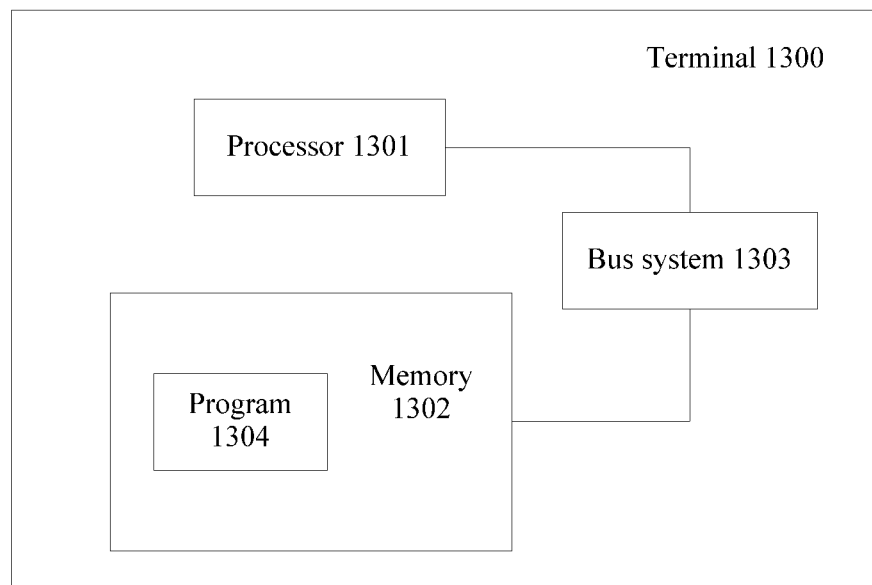
FIG. 13 is a schematic structural diagram of another embodiment of a terminal according to the present disclosure.

The specific structure of the terminal is described from a perspective of a function module with reference to FIG. 9 and FIG. 10. The following further describes the specific structure of the terminal from a perspective of hardware with reference to FIG. 13.

A terminal 1300 includes:

one or more processors 1301, a memory 1302, a bus system 1303, and one or more programs 1304, where the processor 1301 is connected to the memory 1302 by using the bus system 1303.

The one or more programs 1304 are stored in the memory 1302, the one or more programs 1304 include an instruction, and when the instruction is executed by the terminal 1300, the terminal 1300 performs the method in any embodiment in FIG. 3 to FIG. 5A and FIG. 5B.

Figure 14:
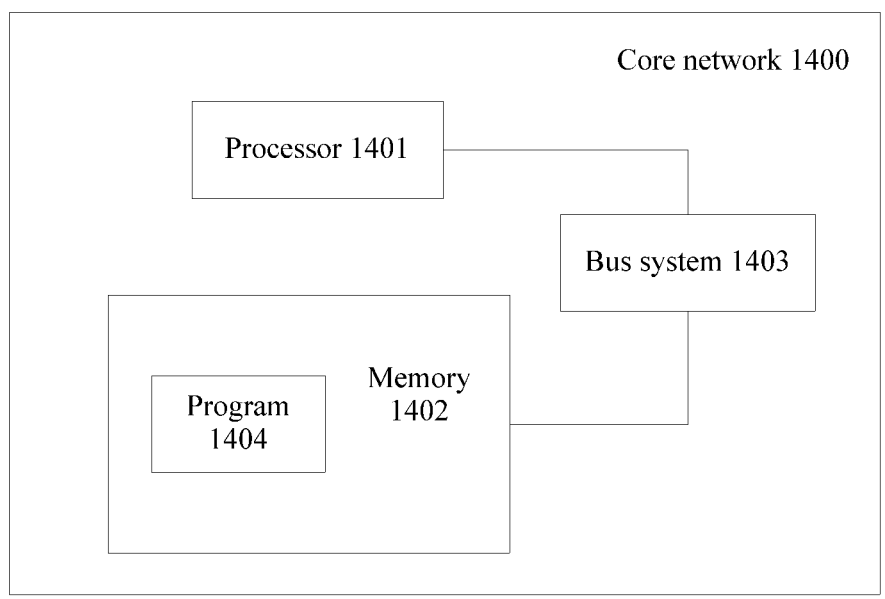
FIG. 14 is a schematic structural diagram of another embodiment of a core network according to the present disclosure.

The specific structure of the core network is described from a perspective of a function module with reference to FIG. 11. The following further describes the specific structure of the core network from a perspective of hardware with reference to FIG. 14.

A core network 1400 includes:

one or more processors 1401, a memory 1402, a bus system 1403, and one or more programs 1404, where the processor 1401 is connected to the memory 1402 by using the bus system 1403.

The one or more programs 1404 are stored in the memory 1402, the one or more programs 1402 include an instruction, and when the instruction is executed by the core network 1400, the core network 1400 performs the method in any embodiment in FIG. 3 to FIG. 5A and FIG. 5B.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

In accordance with the disclosure, this application provides the following additional embodiments:

Embodiment 1: A method for accessing an inter-RAT cell, comprising: sending, by a base station, a first message to a terminal, wherein the first message is used to instruct the terminal to access an inter-RAT cell.

Embodiment 2: The method according to Embodiment 1, wherein before the sending, by a base station, a first message to a terminal, the method further comprises: receiving, by the base station, a second message sent by a core network, wherein the second message comprises first indication information, and the first indication information is used to instruct the terminal to access the inter-RAT cell.

Embodiment 3: The method according to Embodiment 2, wherein the second message is used to page the terminal or set up an evolved radio access bearer E-RAB.

Embodiment 4: The method according to Embodiments 2 or 3, wherein the first indication information comprises inter-RAT instruction information, and the inter-RAT instruction information is used to instruct the terminal to select an inter-RAT cell for access; and the sending, by a base station, a first message to a terminal comprises: sending, by the base station to the terminal, the first message that carries the inter-RAT instruction information.

Embodiment 5: The method according to Embodiments 2 or 3, wherein the first indication information comprises inter-RAT service type indication information, and an inter-RAT service type indicated by the inter-RAT service type indication information needs to be transmitted in an inter-RAT cell; and the sending, by a base station, a first message to a terminal comprises: sending, by the base station to the terminal, the first message that carries second indication information, wherein the second indication information is the inter-RAT service type indication information.

Embodiment 6: The method according to Embodiments 2 or 3, wherein the first indication information comprises inter-RAT service type indication information, and an inter-RAT service type indicated by the inter-RAT service type indication information needs to be transmitted in an inter-RAT cell; and the sending, by a base station, a first message to a terminal comprises: sending, by the base station to the terminal, the first message that carries second indication information, wherein the second indication information is inter-RAT instruction information, and the inter-RAT instruction information is used to instruct the terminal to select an inter-RAT cell for access.

Embodiment 7: The method according to Embodiments 5 or 6, wherein before the sending, by a base station, a first message to a terminal, the method further comprises: adding, by the base station, the second indication information to the first message if the base station determines that the base station cannot carry a service supported by the inter-RAT cell indicated by the first indication information.

Embodiment 8: The method according to Embodiment 1, wherein if the second message is used to set up an evolved radio access bearer E-RAB, before the sending, by a base station, a first message to a terminal, the method further comprises: receiving, by the base station, a second message sent by a core network, wherein the second message comprises first indication information, and the first indication information is used to indicate a quality of service QoS parameter.

Embodiment 9: The method according to Embodiment 8, wherein before the sending, by a base station, a first message to a terminal, the method further comprises: receiving, by the base station, an inter-RAT cell measurement report sent by the terminal; and the sending, by a base station, a first message to a terminal comprises: sending, by the base station, the first message that comprises an inter-RAT cell identifier to the terminal.

Embodiment 10: The method according to Embodiment 9, wherein before the receiving, by the base station, an inter-RAT cell measurement report sent by the terminal, the method further comprises: sending, by the base station, a measurement report request to the terminal, wherein the measurement report request comprises inter-RAT instruction information, and the inter-RAT instruction information is used to instruct the terminal to perform inter-RAT cell measurement to generate the inter-RAT cell measurement report.

Embodiment 11: The method according to any one of claims 1 to 10, wherein the inter-RAT cell is a cell that supports a new radio access technology new RAT, a 2G cell, or a 3G cell.

Embodiment 12: A method for accessing an inter-RAT cell, comprising: sending, by a core network, a second message to a base station, so that the base station sends a first message to a terminal based on the second message, wherein the first message is used to instruct the terminal to access an inter-RAT cell.

Embodiment 13: The method according to Embodiment 12, wherein the sending, by a core network, a second message to a base station comprises: sending, by the core network, the second message that comprises first indication information to the base station, wherein the first indication information is used to instruct the terminal to access the inter-RAT cell.

Embodiment 14: The method according to Embodiment 13, wherein the sending, by a core network, a second message to a base station comprises: sending, by the core network to the base station, the second message that is used to page the terminal or set up an evolved radio access bearer E-RAB.

Embodiment 15: The method according to Embodiments 13 or 14, wherein the first indication information comprises inter-RAT instruction information, and the inter-RAT instruction information is used to instruct the terminal to select an inter-RAT cell for access.

Embodiment 16: The method according to Embodiments 13 or 14, wherein the first indication information comprises inter-RAT service type indication information, and an inter-RAT service type indicated by the inter-RAT service type indication information needs to be transmitted in an inter-RAT cell.

Embodiment 17: The method according to Embodiments 13 or 14, wherein if the second message is used to set up an evolved radio access bearer E-RAB, the first indication information is used to indicate a quality of service QoS parameter.

Embodiment 18: The method according to any one of Embodiments 12 to 17, wherein the inter-RAT cell is a cell that supports a new radio access technology new RAT, a 2G cell, or a 3G cell.

Embodiment 19: A base station, comprising: a first sending unit, configured to send a first message to a terminal, wherein the first message is used to instruct the terminal to access an inter-RAT cell.

Embodiment 20: The base station according to Embodiment 19, wherein the inter-RAT cell is a cell that supports a new radio access technology new RAT, a 2G cell, or a 3G cell.

Embodiment 21: The base station according to Embodiment 19, wherein if the second message is used to set up an evolved radio access bearer E-RAB, the base station further comprises: a second receiving unit, configured to receive a second message sent by a core network, wherein the second message comprises first indication information, and the first indication information is used to indicate a quality of service QoS parameter.

Embodiment 22: The base station according to Embodiment 21, wherein the base station further comprises: a third receiving unit, configured to receive an inter-RAT cell measurement report sent by the terminal, wherein the first sending unit is further configured to send the first message that comprises an inter-RAT cell identifier to the terminal.

Embodiment 23: The base station according to Embodiment 22, wherein the base station further comprises: a second sending unit, configured to send a measurement report request to the terminal, wherein the measurement report request comprises inter-RAT instruction information, and the inter-RAT instruction information is used to instruct the terminal to perform inter-RAT cell measurement to generate the inter-RAT cell measurement report.

Embodiment 24: A core network, comprising: a generation unit, configured to generate a second message; and a fourth sending unit, configured to send the second message to a base station, so that the base station sends a first message to a terminal based on the second message, wherein the first message is used to instruct the terminal to access an inter-RAT cell.

Embodiment 25: The core network according to Embodiment 24, wherein the fourth sending unit is further configured to send the second message that comprises first indication information to the base station, wherein the first indication information is used to instruct the terminal to access the inter-RAT cell.

Embodiment 26: The core network according to Embodiment 25, wherein the fourth sending unit is further configured to send, to the base station, the second message that is used to page the terminal or set up an evolved radio access bearer E-RAB.

Embodiment 27: The core network according to Embodiments 25 or 26, wherein the first indication information sent by the fourth sending unit comprises inter-RAT instruction information, and the inter-RAT instruction information is used to instruct the terminal to select an inter-RAT cell for access.

Embodiment 28: The core network according to Embodiments 25 or 26, wherein the first indication information sent by the fourth sending unit comprises inter-RAT service type indication information, and an inter-RAT service type indicated by the inter-RAT service type indication information needs to be transmitted in an inter-RAT cell.

Embodiment 29: The core network according to Embodiments 25 or 26, wherein if the second message is used to set up an evolved radio access bearer E-RAB, the first indication information sent by the fourth sending unit is used to indicate a quality of service QoS parameter.

Embodiment 30: The core network according to any one of Embodiments 24 to 29, wherein the inter-RAT cell is a cell that supports a new radio access technology new RAT, a 2G cell, or a 3G cell.

Embodiment 31: A base station, comprising: one or more processors, a memory, a bus system, and one or more programs, wherein the processor is connected to the memory by using the bus system; and the one or more programs are stored in the memory, the one or more programs comprise an instruction, and when the instruction is executed by the base station, the base station performs the method according to any one of Embodiments 1 to 11.

Embodiment 32: A core network, comprising: one or more processors, a memory, a bus system, and one or more programs, wherein the processor is connected to the memory by using the bus system; and the one or more programs are stored in the memory, the one or more programs comprise an instruction, and when the instruction is executed by the core network, the core network performs the method according to any one of Embodiments 12 to 18.

Embodiment 33: A method for accessing an inter-RAT cell, comprising: receiving, by a terminal, a first message sent by a base station, wherein the first message is used to instruct the terminal to access an inter-RAT cell; and accessing, by the terminal based on the first message, an inter-RAT cell selected by the terminal.

Embodiment 34: The method according to Embodiment 33, wherein the receiving, by a terminal, a first message sent by a base station comprises: receiving, by the terminal, the first message that is sent by the base station and that comprises inter-RAT instruction information, wherein the inter-RAT instruction information is used to instruct the terminal to select an inter-RAT cell for access; and the accessing, by the terminal based on the first message, an inter-RAT cell selected by the terminal comprises: accessing, by the terminal, the selected inter-RAT cell according to the inter-RAT instruction information.

Embodiment 35: The method according to Embodiment 33, wherein the receiving, by a terminal, a first message sent by a base station comprises: receiving, by the terminal, the first message that is sent by the base station and that carries second indication information, wherein the second indication information is the inter-RAT service type indication information; and the accessing, by the terminal based on the first message, an inter-RAT cell selected by the terminal comprises: accessing, by the terminal according to the second indication information, the inter-RAT cell selected by the terminal.

Embodiment 36: The method according to Embodiment 33, wherein before the receiving, by a terminal, a first message sent by a base station, the method further comprises: sending, by the terminal, an inter-RAT cell measurement report to the base station; the receiving, by a terminal, a first message sent by a base station comprises: receiving, by the terminal, the first message that is sent by the base station and that comprises an inter-RAT cell identifier; and the accessing, by the terminal based on the first message, an inter-RAT cell selected by the terminal comprises: accessing, by the terminal based on the inter-RAT cell identifier, an inter-RAT cell corresponding to the inter-RAT cell identifier.

Embodiment 37: The method according to Embodiment 36, wherein before the sending, by the terminal, an inter-RAT cell measurement report to the base station, the method further comprises: receiving, by the terminal, a measurement report request sent by the base station, wherein the measurement report request comprises inter-RAT instruction information; and performing, by the terminal, inter-RAT cell measurement according to the inter-RAT instruction information to generate the inter-RAT cell measurement report.

Embodiment 38: The method according to any one of Embodiments 33 to 37, wherein the inter-RAT cell is a cell that supports a new radio access technology new RAT, a 2G cell, or a 3G cell.

Embodiment 39: A terminal, comprising: one or more processors, a memory, a bus system, and one or more programs, wherein the processor is connected to the memory by using the bus system; and the one or more programs are stored in the memory, the one or more programs comprise an instruction, and when the instruction is executed by the terminal, the terminal performs the method according to any one of Embodiments 33 to 38.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for accessing a cell, comprising:
receiving, by a terminal, a first message from a first base station, wherein a first cell of the first base station corresponds to a first radio access technology (RAT), wherein the first message comprises instruction information based on a second RAT standard, wherein the instruction information based on the second RAT standard instructs the terminal to access a second cell corresponding to a second RAT to initiate a service, wherein the second cell includes a second base station, and wherein the first message comprises an identifier for the second cell corresponding to the second RAT;
sending, by the terminal, a measurement report of cells corresponding to the second RAT to the first base station, wherein the identifier for the second cell is selected based on the measurement report; and
accessing, by the terminal, the second base station based on the identifier for the second cell included in the first message to initiate the service, wherein the service is supported by the second RAT and is not supported by the first RAT;
wherein a second message is received by a receiver in the first base station from a core network, wherein the second message comprises first indication information, and the first indication information is used to instruct the terminal to access the second cell;
wherein the second message is used to page the terminal in response to the terminal being in an idle mode; and
wherein the second message is used to set up an evolved radio access bearer (E-RAB) in response to the terminal being in a connected mode.

2. The method according to claim 1, further comprising:
receiving, by the terminal, a measurement report request from the first base station, wherein the measurement report request comprises instruction information based on the second RAT standard; and
performing, by the terminal, a measurement of cells corresponding to the second RAT according to the instruction information based on the second RAT standard to generate the measurement report of cells corresponding to the second RAT.

3. The method according to claim 1, wherein:
the first cell supports LTE (Long Term Evolution); and
the second cell supports a new radio access technology (new RAT), a 2G cell technology, or a 3G cell technology.

4. A terminal, comprising:
a processor;
a receiver; and
a transmitter,
wherein:
the receiver is configured to receive a first message from a first base station, wherein the first base station is in a first cell corresponding to a first radio access technology (RAT), wherein the first message comprises instruction information based on a second RAT standard, wherein the instruction information based on the second RAT standard instructs the terminal to access a second cell corresponding to a second RAT to initiate a service, wherein the second cell includes a second base station, and wherein the first message comprises an identifier for the second cell corresponding to the second RAT;
the transmitter is configured to send a measurement report of cells corresponding to the second RAT to the first base station, and wherein the identifier for the second cell is selected based on the measurement report; and
the processor is configured to access the second base station based on the identifier for the second cell included in the first message to initiate the service, wherein the service is support by the second RAT and is not supported by the first RAT;
wherein a second message is received by a receiver in the first base station from a core network, wherein the second message comprises first indication information, and the first indication information is used to instruct the terminal to access the second cell;
wherein the second message is used to page the terminal in response to the terminal being in an idle mode; and
wherein the second message is used to set up an evolved radio access bearer (E-RAB) in response to the terminal being in a connected mode.

5. The terminal according to claim 4,
wherein the receiver is further configured to receive a measurement report request from the first base station, wherein the measurement report request comprises instruction information based on the second RAT standard; and
wherein the processor is further configured to perform a measurement of cells corresponding to the second RAT according to the instruction information based on the second RAT standard to generate the measurement report of cells corresponding to the second RAT.

6. The terminal according to claim 4, wherein:
the first cell supports LTE (Long Term Evolution); and
the second cell supports a new radio access technology (new RAT), a 2G cell technology, or a 3G cell technology.

7. A system, comprising:
a first base station included in a first cell, wherein the first cell corresponds to a first radio access technology (RAT);
a second base station included in a second cell, wherein the second cell corresponds to a second RAT; and
a terminal configured to:
receive a first message from the first base station, wherein the first message comprises instruction information based on a second RAT standard, wherein the instruction information based on the second RAT standard instructs the terminal to access the second cell corresponding to the second RAT to initiate a service, wherein the second cell includes a second base station, and wherein the first message comprises an identifier for the second cell corresponding to the second RAT;
send a measurement report of cells corresponding to the second RAT to the first base station, wherein the identifier for the second cell is selected based on the measurement report; and
access the second base station based on the identifier for the second cell included in the first message to initiate the service, wherein the service is supported by the second RAT and is not supported by the first RAT;
wherein the first base station includes a receiver configured to receive a second message from a core network, wherein the second message comprises first indication information, and the first indication information is used to instruct the terminal to access the second cell;
wherein the second message is used to page the terminal in response to the terminal being in an idle mode; and
wherein the second message is used to set up an evolved radio access bearer (E-RAB) in response to the terminal being in a connected mode.

8. The system according to claim 7,
wherein second indication information comprises service type indication information, wherein the service type indication information indicates a service type of the service; and
wherein the first message carries the second indication information.

9. The system according to claim 8, wherein the first base station is further configured to:
add the second indication information to the first message in response to determining that the first base station cannot support the service indicated by the second indication information.

10. The system according to claim 7, wherein the second message indicates a quality of service (QoS) parameter.

* * * * *